US008242716B2

United States Patent
Je et al.

(10) Patent No.: US 8,242,716 B2
(45) Date of Patent: Aug. 14, 2012

(54) LIQUID CRYSTAL DISPLAY DEVICE AND METHOD OF DRIVING THE SAME

(75) Inventors: Sung-Min Je, Gyeongsangbuk-do (KR); Dong-Hoon Jang, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 12/857,009

(22) Filed: Aug. 16, 2010

(65) Prior Publication Data

US 2011/0050131 A1      Mar. 3, 2011

(30) Foreign Application Priority Data

Aug. 28, 2009    (KR) .................. 10-2009-0080447

(51) Int. Cl.
*H05B 37/02* (2006.01)
(52) U.S. Cl. ...................................... 315/312; 315/297
(58) Field of Classification Search .............. 315/312, 315/297, 307, 246, 294
See application file for complete search history.

(56) References Cited

U.S. PATENT DOCUMENTS

| | | | |
|---|---|---|---|
| 2008/0144236 A1* | 6/2008 | Chiang et al. | 361/18 |
| 2009/0302776 A1* | 12/2009 | Szczeszynski | 315/246 |
| 2010/0033110 A1* | 2/2010 | Chien | 315/294 |
| 2010/0072922 A1* | 3/2010 | Szczeszynski et al. | 315/297 |

* cited by examiner

*Primary Examiner* — Daniel D Chang
(74) *Attorney, Agent, or Firm* — Morgan, Lewis & Bockius LLP

(57) ABSTRACT

A backlight driving circuit for a liquid crystal display device including a light emitting diode controlling portion for outputting a brightness control signal, a light emitting diode driving portion that amplifies an input voltage to produce the first driving voltage and that uses the brightness control signal to adjust a second driving voltage, a backlight unit including a plurality of channels, each of the plurality of channels including a light emitting diode array supplied in common with the first and second driving voltages from the light emitting diode driving portion, a feedback voltage terminal on each of the plurality of channels that outputs a feedback voltage to the light emitting diode controlling portion, a detecting element on each of the plurality of channels that detects the feedback voltage, and a current set resistor disposed between the plurality of channels and a ground terminal of the light emitting diode driving portion.

18 Claims, 6 Drawing Sheets

LIQUID CRYSTAL DISPLAY DEVICE AND METHOD OF DRIVING THE SAME

This application claims the benefit of Korean Patent Application No. 10-2009-0080447 filed on Aug. 28, 2009, which is hereby incorporated by reference.

BACKGROUND OF THE INVENTION

1. Field of the Invention

The present invention relates to a liquid crystal display device, and more particularly, to a liquid crystal display device and a method of driving the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device uses a backlight to supply light to a liquid crystal panel. A cold cathode fluorescent lamp (CCFL) and an external electrode fluorescent lamp (EEFL) are widely used as the backlight. Recently, a light emitting diode (LED) has been used as the backlight.

FIG. 1 is a schematic view illustrating a multi-channel type LED backlight and a multi-channel type driving circuit according to the related art.

Referring to FIG. 1, the backlight 40 includes a plurality of channels CH1 to CHn, and a plurality of LEDs are arranged along each of the channels CH1 to CHn. The channels CH1 to CHn are connected to the multi-channel type driving circuit 45 which separately operates the channels CH1 to CHn.

The multi-channel type driving circuit 45 separately outputs a plurality of driving voltages through a plurality of output terminals OUT1 to OUTn into the plurality of channels CH1 to CHn, respectively, and separately receives feedbacks of the plurality of channels CH1 to CHn through a plurality of feedback terminals FB1 to FBn, respectively, to check the status of each channel. Accordingly, the driving circuit 45 makes a desired current flow on the corresponding channel. Further, when at least one LED has a defect such as open-circuit defect or short-circuit defect, the driving circuit 45 performs a protection operation for the channel having the defective LED.

However, the multi-channel type driving circuit 45 is expensive, and thus production costs increase. To reduce production costs, a relatively cheap single channel type driving circuit is used for the multi-channel type LED backlight.

FIG. 2 is a schematic view illustrating a multi-channel type LED backlight and a single-channel type driving circuit according to the related art.

Referring to FIG. 2, the single-channel type driving circuit 46 includes one output terminal OUT and one feedback terminal FB. A plurality of channels CH1 to CHn are connected in common to the output terminal OUT and the feedback terminal FB thus controlled in common by the single-channel type driving circuit 46.

However, since the channels CH1 to CHn are connected in common to the feedback terminal FB, it is difficult to check the status of each channel. In other words, even though at least one channel is defective, a feedback detected through the feedback terminal FB is substantially the same as a feedback when all channels are in normal status. Accordingly, the backlight 40 is recognized as if it had a normal status, and thus the defective channel cannot be found and a protection operation for the backlight 40 cannot be performed.

For example, when one of the channels CH1 to CHn has an open-circuit defect, other channels in normal status have an overcurrent, and thus the LEDs therein may be damaged. Further, when one of the channels CH1 to CHn has a short-circuit defect, the defective channel has an overcurrent, and thus the LEDs therein may be damaged.

As such, when the single-channel type driving circuit is used for the multi-channel type LED backlight, the defective channel cannot be found. Accordingly, a protection operation for the LED backlight cannot be performed.

SUMMARY OF THE INVENTION

Accordingly, the present invention is directed to a liquid crystal display device and a method of driving the same which substantially obviates one or more of the problems due to limitations and disadvantages of the related art.

An object of the present invention is to provide a liquid crystal display device and a method of driving the same that can protect a backlight having a defect.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a liquid crystal display device and a method of driving the same includes a backlight driving circuit for a liquid crystal display device including a light emitting diode controlling portion for outputting a brightness control signal, a light emitting diode driving portion that amplifies an input voltage to produce the first driving voltage and that uses the brightness control signal to adjust a second driving voltage, a backlight unit including a plurality of channels, each of the plurality of channels including a light emitting diode array supplied in common with the first and second driving voltages from the light emitting diode driving portion, a feedback voltage terminal on each of the plurality of channels that outputs a feedback voltage to the light emitting diode controlling portion, a detecting element on each of the plurality of channels that detects the feedback voltage, and a current set resistor disposed between the plurality of channels and a ground terminal of the light emitting diode driving portion.

In another aspect, the liquid crystal display device and a method of driving the same includes a method of operating a backlight unit of a liquid crystal display device including the steps of detecting a plurality of feedback voltages at a backlight unit, the feedback voltages detected through a plurality of detecting elements and inputted into a plurality of feedback terminals of a light emitting diode controlling portion, the backlight unit including a plurality of channels, each of the plurality of channels including a light emitting diode array supplied in common with first and second driving voltages from the light emitting diode driving portion, converting the feedback voltages into feedback signals through a plurality of analog to digital converters at the light emitting diode controlling portion, determining whether any of the feedback signals meet a defect condition using the plurality of detecting elements, and outputting a brightness control signal at the light emitting diode controlling portion to a light emitting diode driving portion according to the determining step, the brightness control signal adjusting the second driving voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
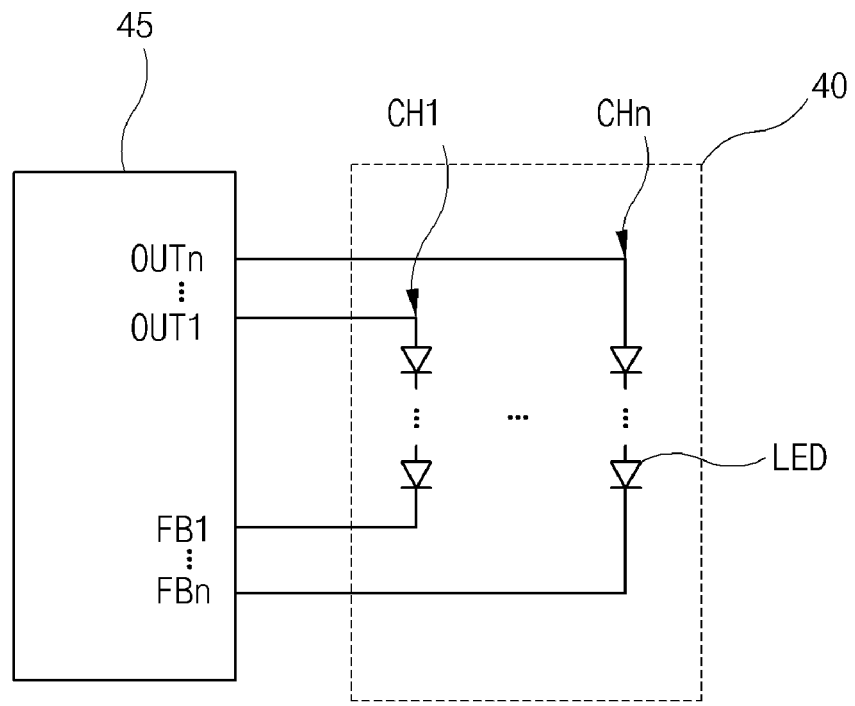
FIG. 1 is a schematic view illustrating a multi-channel type LED backlight and a multi-channel type driving circuit according to the related art.
Figure 2:
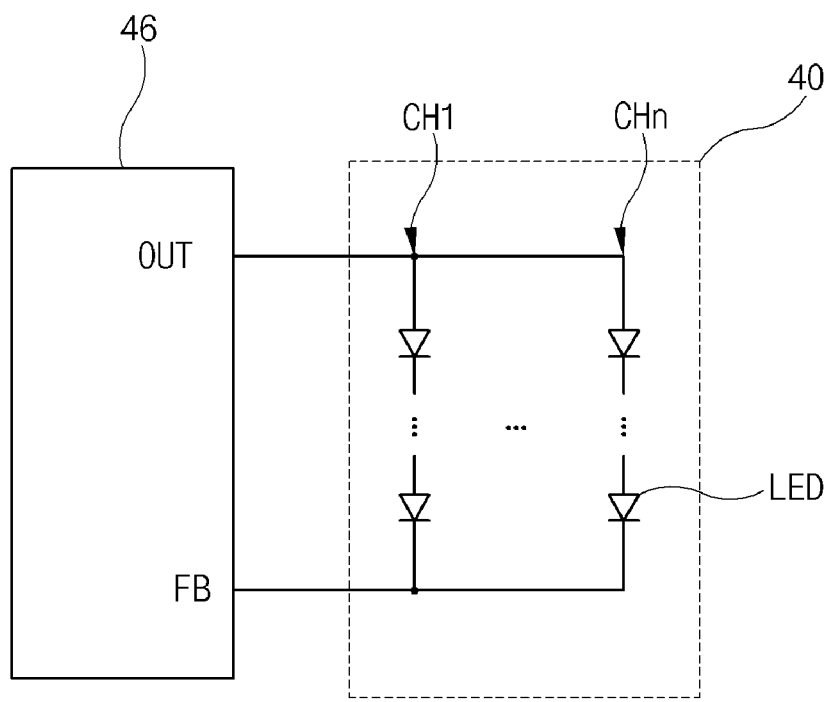
FIG. 2 is a schematic view illustrating a multi-channel type LED backlight and a single-channel type driving circuit according to the related art.
Figure 3:
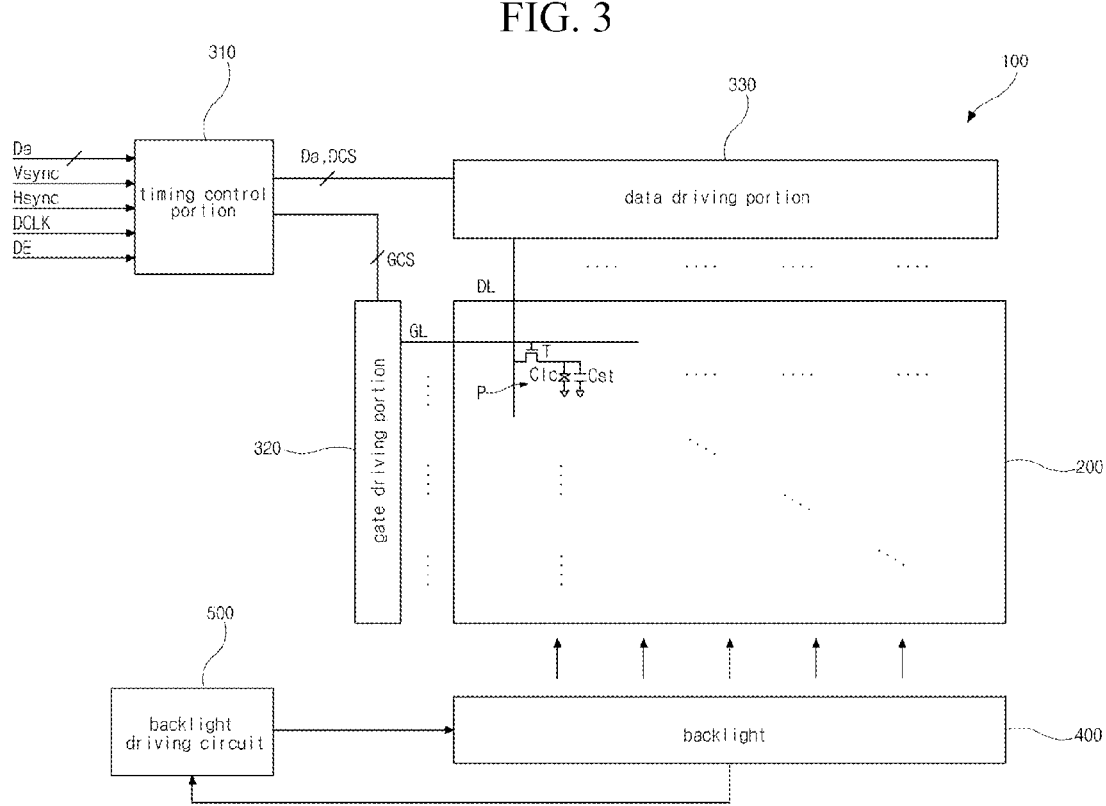
FIG. 3 is a schematic view illustrating a liquid crystal display device according to an exemplary embodiment of the present invention.
Figure 4:
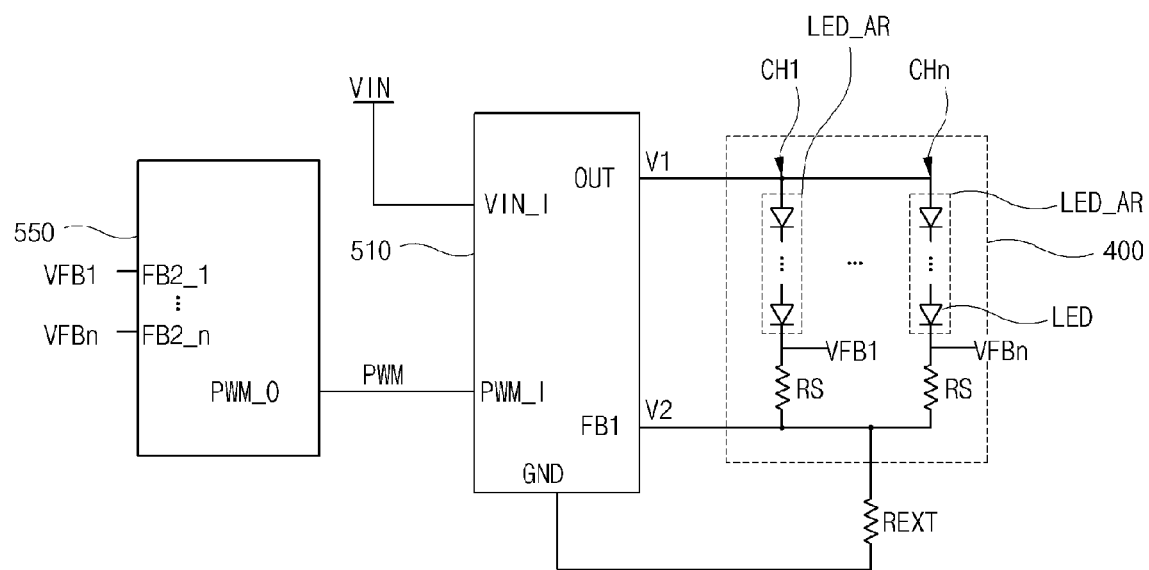
FIG. 4 is a view illustrating an exemplary backlight and backlight driving circuit of FIG. 3.
Figure 5:
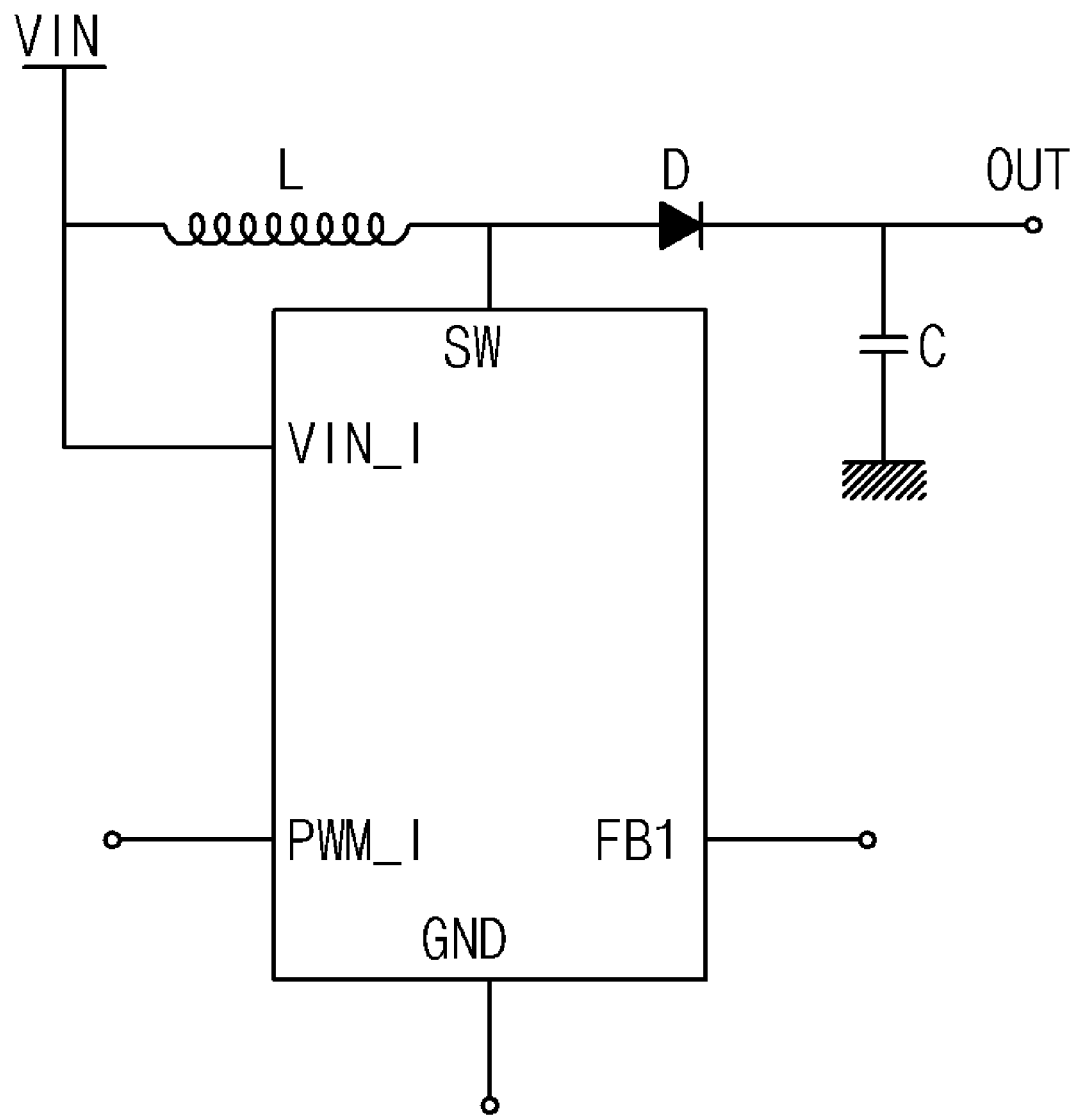
FIG. 5 is a view illustrating an exemplary LED driving portion of FIG. 4.
Figure 6:
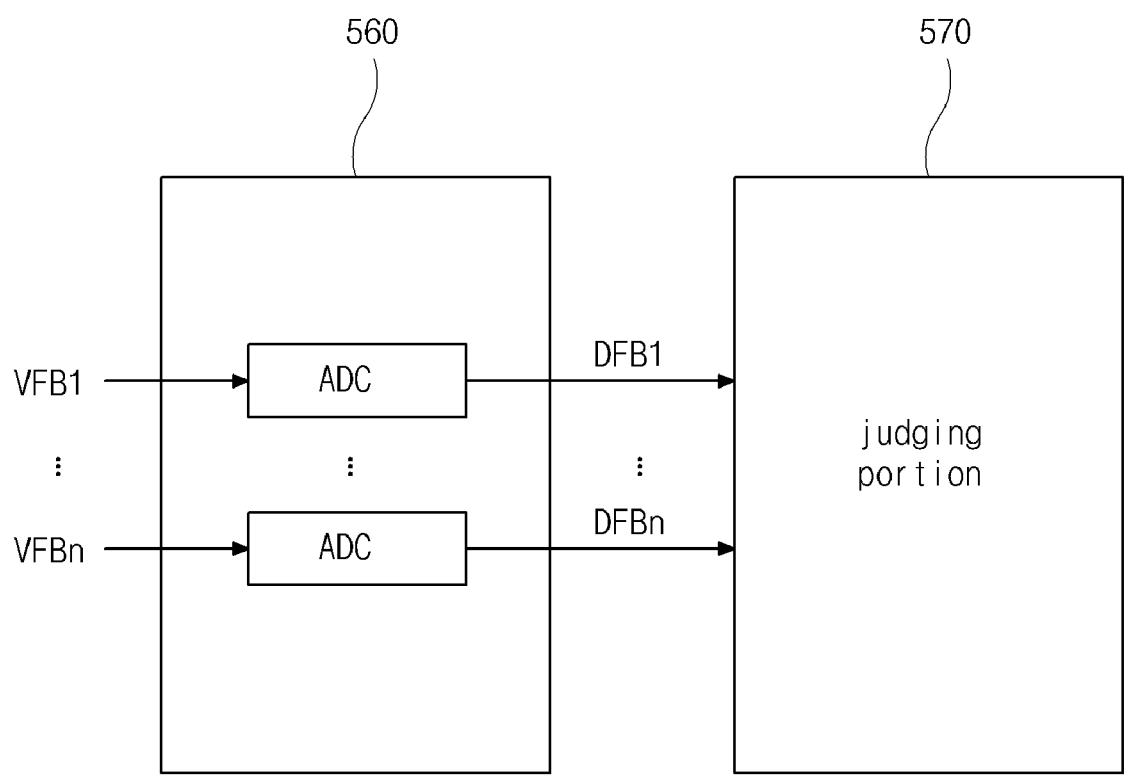
FIG. 6 is a view illustrating an exemplary LED controlling portion of FIG. 4.

FIG. 3 is a schematic view illustrating a liquid crystal display device according to an exemplary embodiment of the present invention. FIG. 4 is a view illustrating an exemplary backlight and backlight driving circuit of FIG. 3. FIG. 5 is a view illustrating an exemplary LED driving portion of FIG. 4. FIG. 6 is a view illustrating an exemplary LED controlling portion of FIG. 4.

Referring to FIGS. 3 and 6, the liquid crystal display device 100 includes a liquid crystal panel 200, a panel driving circuit, a backlight 400, and a backlight driving circuit 500. The panel driving circuit includes a timing control portion 310, a gate driving portion 320, and a data driving portion 330.

The liquid crystal panel 200 includes a plurality of gate lines GL and a plurality of data lines DL crossing each other, and a plurality of pixels P formed at the intersections of gate and data lines GL and DL. The gate and data lines GL and DL are connected to the corresponding pixel P. A transistor T is formed in the pixel P and connected to the gate and data lines GL and DL. A pixel electrode is connected to the transistor T. A common electrode faces the pixel electrode. The common and pixel electrodes as well as a liquid crystal layer therebetween form a pixel capacitor Clc. A storage capacitor Cst may be formed in the pixel P. The storage capacitor Cst functions to store a data voltage supplied to the pixel P.

The panel driving circuit includes a timing control portion 310, a gate driving portion 320, and a data driving portion 330. The timing control portion 310 is supplied from an external system, such as a TV system or video card, with data signals Da, a vertical synchronizing signal Vsync, a horizontal synchronizing signal Hsync, a clock signal DCLK, and a data enable signal DE. Even though not shown in the drawings, these signals may be supplied to the timing control portion 310 through an interface circuit. The timing control portion 310 produces a gate control signal GCS to control the gate driving portion 320, and a data control signal DCS to control the data driving portion 330. The gate control signal GCS may include a gate start pulse, a gate shift clock, and a gate output enable signal. The data control signal DCS may include a source start pulse, a source shift clock, a source output enable signal, and a polarity signal.

The gate driving portion 320 sequentially scans the gate lines GL in response to the gate control signal GCS. In a scanning period for the gate line GL, the gate driving portion 320 outputs a turn-on voltage to the gate line GL to turn on the transistor T connected to the gate line GL. In a non-scanning period for the gate line GL, the gate driving portion 320 outputs a turn-off voltage to the gate line GL.

The data driving portion 330 outputs a data voltage to the corresponding data line DL in response to the data control signal DCS. The data driving portion 330 generates the data voltage corresponding to the data signal Da using the gamma reference voltages.

Even though not shown in the drawings, a gamma reference voltage generator generates a plurality of gamma reference voltages and supplies the gamma reference voltages to the data driving portion 330. A power supply supplies voltages to operate components of the liquid crystal display device 100.

The backlight 400 supplies light to the liquid crystal panel 200. In the exemplary embodiment shown in FIG. 4, light emitting diodes (LEDs) are used for the backlight 400. The backlight 400 includes a plurality of channels CH1 to CHn. An LED array LED_AR including a plurality of LEDs connected in series is arranged on each of the channels CH1 to CHn. On each of the channels CH1 to CHn, there is a detecting element to detect a feedback voltage of the corresponding LED array LED_AR. For example, a resistor RS may be used as the detecting element. Resistors RS of the channels CH1 to CHn may have the same resistance. The resistor RS may be connected in series to a forward end of the LED array LED_AR out of both ends of the LED array LED_AR.

Referring to FIG. 4, the backlight driving circuit 500 includes an LED driving portion 510 and an LED controlling portion 550. A single-channel type driving circuit may be used for the LED driving portion 510. For example, one end of each of channels CH1 to CHn is connected in common to an output terminal OUT of the LED driving portion 510. Accordingly, the channels CH1 to CHn are supplied in common with a first driving voltage V1 from the LED driving portion 510. The other end of each of channels CH1 to CHn is connected in common to a first feedback terminal FB1 of the LED driving portion 510. Accordingly, the feedback terminal FB1 gets a feedback voltage of all channels CH1 to CHn. Accordingly, in a case that all channels CH1 to CHn have a defect, the defect may be detected through the feedback terminal FB1.

However, a status of each of the channels CH1 to CHn cannot be checked through the first feedback terminal FB1. Accordingly, even though some of channels CH1 to CHn have a defect, the defective part cannot be detected through the first feedback terminal FB1. To solve this problem, the LED controlling portion 550 is employed in this exemplary embodiment.

The LED driving portion 510 includes a signal input terminal PWM_I to receive a brightness control signal. A pulse width modulation signal PWM may be used as the brightness control signal. The pulse width modulation signal PWM is outputted from a signal output terminal PWM_O of the LED controlling portion 550.

The LED driving portion 510 operates such that a brightness of the LED may be adjusted according to a pulse width, i.e., a duty ratio of the pulse width modulation signal PWM. For example, as the duty ratio of the pulse width modulation signal PWM increases or decreases, the brightness of the LED increases or decreases. To do this, a second driving voltage V2 may be applied at the first feedback terminal FB1, and a current set resistor REXT may be employed.

One end of the current set resistor REXT is connected to a node between the channels CH1 to CHn and the first feedback terminal FB1. The other end of the current set resistor REXT may be grounded. For example, the other end of the current set resistor REXT may be connected to a ground terminal GND of the LED driving portion 510.

When the second driving voltage V2 is applied, a current (I_EXT) flowing on the current set resistor REXT is I_EXT=V2/REXT. According to Kirchhoff's circuit law, a total current (I_TOT) of the channels CH1 to CHn is the same as the current I_EXT (I_TOT=I_EXT). Accordingly, adjusting the second driving voltage V2 determines the currents of the channels CH1 to CHn. The second driving voltage V2 is adjusted according to adjusting the duty ratio of the pulse width modulation signal PWM. Therefore, adjusting the duty ratio of the pulse width modulation signal PWM causes adjusting the second driving voltage V2, and this adjusting sets the currents of the channels CH1 to CHn. For example, as the duty ratio of the pulse width modulation signal PWM increases or decreases, the second driving voltage V2 increases or decreases, and thus the currents of the channels CH1 to CHn increase or decrease.

The first driving voltage V1 may be adjusted along with adjusting the second voltage. For example, the first driving voltage V1 increases or decreases as the second driving voltage V2 increases or decreases. The currents of the channels CH1 to CHn are proportional to a difference between the first and second driving voltages V1 and V2. Accordingly, by adjusting the first driving voltage V1 according to the second voltage V2, the currents corresponding to the second driving voltage V2 can flow on the channels CH1 to CHn.

As described above, the currents to flow on the channels CH1 to CHn are set by adjusting the second driving voltage V2 according to the pulse width modulation signal PWM, and the first driving voltage V1 is adjusted according to the second driving voltage V2. Therefore, the desired currents can flow on the channels CH1 to CHn.

Referring to FIG. 5, the LED driving portion 510 includes an inductor L, a switching element (not shown), a capacitor C, and a diode D. Accordingly, the LED driving portion 510 amplifies an input voltage VIN to produce the first driving voltage V1. A switching terminal SW of the LED driving portion 510 is connected to a source terminal (or drain terminal) of the switching element. A duty ratio of a switching signal, which is supplied to a gate terminal of the switching element, is adjusted according to the second driving voltage V2. For example, the duty ratio of the switching signal increases or decreases as the second driving voltage V2 increases or decreases.

An amplifying ratio of the input voltage VIN is adjusted according to the duty ratio of the switching signal. For example, the amplifying ratio of the input voltage VIN increases or decreases as the duty ratio of the switching signal increases or decreases. Therefore, the input voltage VIN is amplified according to the switching operation, and the amplified input voltage, i.e., the first driving voltage V1 is outputted through the output terminal OUT.

The first and second driving voltages V1 and V2 outputted from the LED driving portion 510 may be a DC voltage.

Referring to FIGS. 4 and 6, the LED controlling portion 550 includes a plurality of second feedback terminals FB2_1 to FB2_n, a converting portion 560, and a judging portion 570.

The second feedback terminals FB2_1 to FB2_n get feedback voltages VFB1 to VFBn of the LED arrays LED_AR, respectively. The feedback voltages VFB1 to VFBn are inputted to the converting portion 560. The converting portion 560 may include converting units corresponding to the second feedback terminals FB2_1 to FB2_n, respectively. An analog-to-digital converter (ADC) may be used as the converting unit. The ADCs convert the feedback voltages VFB1 to VFBn in analog format into feedback signals DFB1 to DFBn in digital format, respectively.

The judging portion 570 judges a status of each of the channels through the feedback signals DFB1 to DFBn. For example, the judging portion 570 judges whether the feedback signal meets a normal status condition or an abnormal status condition. If the judgment is that the feedback signal meets the normal status condition, this means that the channel corresponding to the feedback signal is in defective status, for example has at least one defective LED. Since the defective channel has a bad influence on the backlight 400, a protection operation for the backlight 400 is performed.

As the protection operation for the backlight 400, modulating the pulse width modulation signal PWM may be performed. It is assumed that one of the channels CH1 to CHn has an open-circuit defect. In this case, the other channels in normal status have a higher current than a current when all channels CH1 to CHn are in normal status. In other words, the other channels have an overcurrent. This causes the LEDs of the normal channels to be damaged. To protect the normal channels from overcurrent, it is desired to reduce overcurrent. To do this, the duty ratio of the pulse width modulation signal PWM is reduced so that the second driving voltage V2 is reduced. Accordingly, the current flowing on the current set resistor REXT is reduced. Accordingly, the overcurrent is relieved, and thus the backlight 400 can be protected.

In another aspect, it is assumed that one of the channels CH1 to CHn has a short-circuit defect. In this case, the channel having the short-circuit defect has a higher current than a current when all channels are in normal status. In other words, the defective channel has an overcurrent. This causes the LEDs of the defective channel to be damaged. To protect the defective channel from overcurrent, it is desired to reduce overcurrent. To do this, the duty ratio of the pulse width modulation signal PWM is reduced so that the second driving voltage V2 is reduced. Accordingly, the current flowing on the current set resistor REXT is reduced. Accordingly, the overcurrent is relieved, and thus the backlight 400 can be protected.

As described above, when at least one channel has an open-circuit and/or short-circuit defect, the backlight 400 can be protected by relieving the overcurrent.

Along with or instead of the above-described backlight protection method, another backlight protection method may be performed. For example, an alarm message that the backlight has a defect is displayed on the liquid crystal panel 200 such that a user of the LCD device recognizes the message. When the open/short-circuit defect occurs, the LED controlling portion 550 may supply an alarm signal which indicates the defect occurrence. A micro-computer unit (MCU) may be used for the LED controlling portion 550. To do this, the LED controlling portion 550 may include a terminal outputting the alarm signal. The alarm signal outputted from the LED controlling portion 550 may be transferred to the timing control portion 310 via the interface circuit. Accordingly, the timing control portion 310 may generate alarm data signals to indicate the defect occurrence and output the alarm data signals to the data driving portion 330, and the data driving portion 330 may output data voltages corresponding to the alarm data signals. Accordingly, the liquid crystal panel 200 may display the alarm message. For example, the alarm message "backlight has a defect, please contact a service center to check the backlight" may be used. Accordingly, the user recognizes the backlight defect and can service the backlight.

As described above, when the backlight has a defect, the method of adjusting the current flowing on the channel and/or the method of notifying the user can be used.

Figure 7:
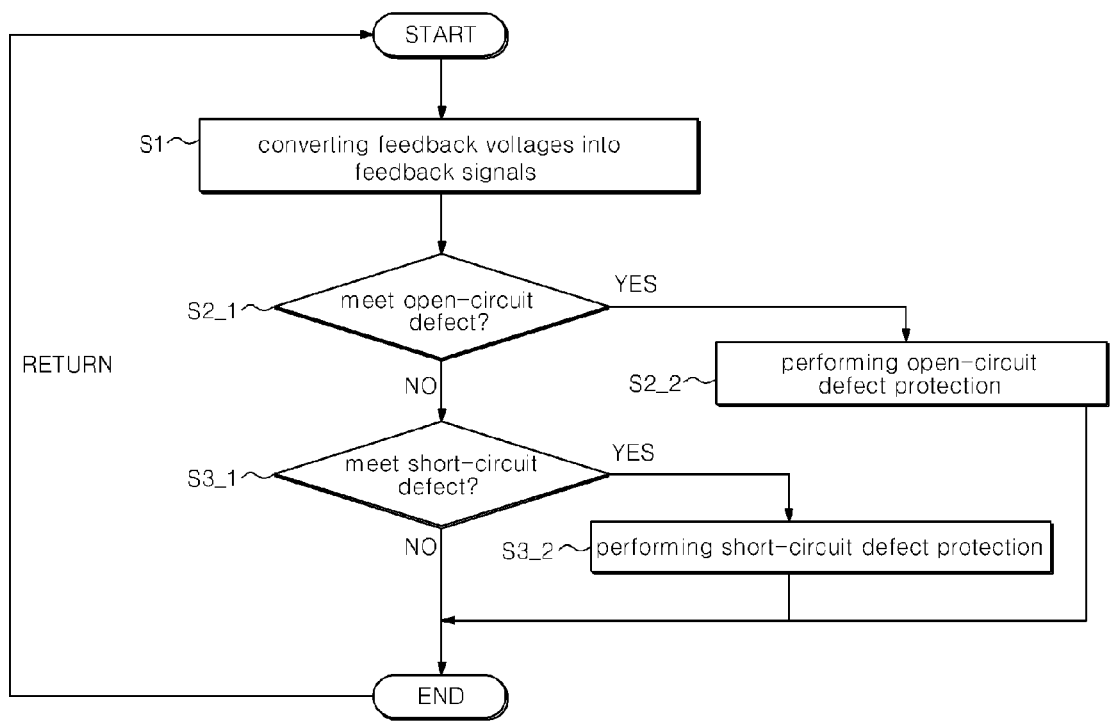
FIG. 7 is an exemplary flow chart illustrating detecting a backlight defect and protecting the backlight according to an exemplary embodiment of the present invention.

An exemplary method of driving the LCD device is explained in more detail further with reference to FIG. 7. FIG. 7 is an exemplary flow chart illustrating detecting a backlight defect and protecting the backlight according to an exemplary embodiment of the present invention.

Referring to FIGS. 1 to 7, the feedback voltages VFB1 to VFBn are converted into the feedback signals DFB1 to DFBn, respectively (step S1). The feedback voltages VFB1 to VFBn are detected through the respective detecting resistors RS and inputted to the second feedback terminals FB2_1 to FB2_n, respectively. The feedback voltages VFB1 to VFBn are converted through the respective ADCs.

Whether the feedback signals DFB1 to DFBn meet a defect condition is judged (steps S2_1 and S3_1). A protection operation is performed when at least one of the feedback signals meets the defect condition (steps S2_2 and S3_2). For example, when it is judged that the open-circuit defect condition is met (step S2_1), the open-circuit defect protection is performed (step S2_2). Further, when it is judged that the short-circuit defect condition is met (step S3_1), the short-circuit defect protection is performed (S3_2). For defect protection, the method of modulating the pulse width of the pulse width modulation signal PWM and/or the method of notifying the user of the defect occurrence may be used.

The steps for the open-circuit defect and the steps for the short-circuit defect may be switched. Further, the steps for the open-circuit defect and the steps for the short-circuit defect may be simultaneously performed.

The above-described process may be repeated periodically. For example, the above described process may be performed every 30 micro-seconds. Also, judging the defect may be performed channel by channel, or simultaneously for all channels. Further, it is desired that the protection operation is performed after the defect judgment for all channels.

As described above, the single-channel type driving circuit operates the channels, and the statuses of the channels are detected. Therefore, even when at least one of the channels is in defect status, the backlight can be effectively protected.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight driving circuit for a liquid crystal display device comprising:
a light emitting diode controlling portion for outputting a brightness control signal;
a light emitting diode driving portion that amplifies an input voltage to produce a first driving voltage and that uses the brightness control signal to adjust a second driving voltage;
a backlight unit including a plurality of channels, each of the plurality of channels including a light emitting diode array supplied in common with the first and second driving voltages from the light emitting diode driving portion;
a feedback voltage terminal on each of the plurality of channels that outputs a feedback voltage to the light emitting diode controlling portion;
a detecting element on each of the plurality of channels that detects the feedback voltage; and
a current set resistor disposed between the plurality of channels and a ground terminal of the light emitting diode driving portion.

2. The backlight driving circuit for a liquid crystal display device according to claim 1 wherein the light emitting diode controlling portion includes a judging portion for determining the status of each of the plurality of channels.

3. The backlight driving circuit for a liquid crystal display device according to claim 2 wherein the second driving voltage is adjusted according a determination made by the judging portion.

4. The backlight driving circuit for a liquid crystal display device according to claim 2 wherein the status of each of the plurality of channels is displayed to a user.

5. The backlight driving circuit for a liquid crystal display device according to claim 2 wherein the light emitting diode controlling portion includes a converting portion for converting the feedback voltages into feedback signals outputted to the judging portion.

6. The backlight driving circuit for a liquid crystal display device according to claim 1 wherein the second driving voltage is adjusted according to a duty ratio of the brightness control signal.

7. The backlight driving circuit for a liquid crystal display device according to claim 6 wherein a change in the duty ratio produces a corresponding change to the second driving voltage and a current of each of the plurality of channels.

8. The backlight driving circuit for a liquid crystal display device according to claim 1 wherein the detecting element is a resistor connected in series on a forward end of the light emitting diode array.

9. The backlight driving circuit for a liquid crystal display device according to claim 1 wherein the first driving voltage is adjusted according to the second driving voltage.

10. The backlight driving circuit for a liquid crystal display device according to claim 9 wherein a current flowing through the current set resistor equals the sum of a plurality of currents following through each of the plurality of channels.

11. A method of operating a backlight unit of a liquid crystal display device comprising the steps of:
- detecting a plurality of feedback voltages at a backlight unit, the feedback voltages detected through a plurality of detecting elements and inputted into a plurality of feedback terminals of a light emitting diode controlling portion, the backlight unit including a plurality of channels, each of the plurality of channels including a light emitting diode array supplied in common with first and second driving voltages from a light emitting diode driving portion;
- converting the feedback voltages into feedback signals through a plurality of analog to digital converters at the light emitting diode controlling portion;
- determining whether any of the feedback signals meet a defect condition using the plurality of detecting elements; and
- outputting a brightness control signal at the light emitting diode controlling portion to the light emitting diode driving portion according to the determining step, the brightness control signal adjusting the second driving voltage.

12. The method of operating a backlight unit of a liquid crystal display device according to claim 11 further comprising the step of setting a current of each of the plurality of channels using a current set resistor disposed between the plurality of channels and the a ground terminal of the light emitting diode driving portion.

13. The method of operating a backlight unit of a liquid crystal display device according to claim 11 wherein the detecting element is a resistor connected in series on a forward end of the light emitting diode array.

14. The method of operating a backlight unit of a liquid crystal display device according to claim 11 wherein the status of each of the plurality of channels is displayed to a user.

15. The method of operating a backlight unit of a liquid crystal display device according to claim 11 wherein the second driving voltage is adjusted according to a duty ratio of the brightness control signal.

16. The method of operating a backlight unit of a liquid crystal display device according to claim 15 wherein a change in the duty ratio produces a corresponding change to the second driving voltage and a current of each of the plurality of channels.

17. The method of operating a backlight unit of a liquid crystal display device according to claim 11 wherein the first driving voltage is adjusted according to the second driving voltage.

18. The method of operating a backlight unit of a liquid crystal display device according to claim 11 wherein a current flowing through the current set resistor equals the sum of a plurality of currents following through each of the plurality of channels.

* * * * *